United States Patent [19]

Roberts et al.

[11] Patent Number: 5,694,281
[45] Date of Patent: Dec. 2, 1997

[54] ZERO SEQUENCE VOLTAGE-POLARIZED DIRECTIONAL ELEMENT FOR PROTECTIVE RELAYS

[75] Inventors: Jeffrey B. Roberts, Moscow, Id.; Armando Guzman-Casillas, Pullman, Wash.

[73] Assignee: Schweitzer Engineering Laboratories, Inc., Pullman, Wash.

[21] Appl. No.: 546,224

[22] Filed: Oct. 20, 1995

[51] Int. Cl.$^6$ .................................................. H02H 3/26
[52] U.S. Cl. ................................................. 361/80; 361/84
[58] Field of Search ........................... 361/42, 44–50, 361/54, 56, 57, 58, 63–66, 76, 78–80, 82, 84, 85, 187, 188; 324/512, 521, 522, 524, 525

[56] References Cited

U.S. PATENT DOCUMENTS 5,349,490  9/1994  Roberts et al. ........................ 361/80
5,365,396  11/1994  Roberts et al. ........................ 361/80

*Primary Examiner*—Brian K. Young
*Assistant Examiner*—Ronald W. Leja
*Attorney, Agent, or Firm*—Jensen & Puntigam, P.S.

[57] ABSTRACT

The directional element produces a quantity related to the zero sequence source impedance of the power system relative to the location of the directional element, from values of zero sequence current and an adjusted value of zero sequence voltage. The impedance quantity is then compared against first and second threshold quantities to identify the direction of a fault. Further, the zero sequence voltage-polarized directional element can be combined with other individual directional elements, including a zero sequence current-polarized directional element and a negative sequence voltage-polarized directional element to form a universal directional element for unbalanced faults, in which the individual directional elements operate in a particular sequence, with the other directional elements being blocked from operating if a prior directional element in the sequence provides a direction indication.

11 Claims, 5 Drawing Sheets

ZERO SEQUENCE VOLTAGE-POLARIZED DIRECTIONAL ELEMENT FOR PROTECTIVE RELAYS

TECHNICAL FIELD

This invention relates generally to directional elements which are used in protective relays for power systems to determine the direction of a fault relative to the relay location, and more specifically concerns such a directional element which uses zero sequence voltage in its directional determination.

BACKGROUND OF THE INVENTION

When a fault is detected on a power system, it is important to identify the direction of the fault relative to the location of the protective relay which makes the fault direction declaration. The fault direction is either downstream of (in front of) the relay, which is referred to as a forward fault, or upstream of (in back of) the relay, which is referred to as a reverse fault. The ability of a protective relay to provide such directional information is of great importance in the overall operation of the relay.

Accurate directional information will guarantee that the relay will not declare a forward fault condition for reverse faults and vice versa. Directional elements are used to provide the desired fault direction information. A relay which has the capability of determining faults in both directions will either have separate forward and reverse directional elements or a single directional element capable of providing information for both directions.

Directional elements in general are well known, among the most popular being negative sequence polarized directional elements and zero sequence polarized directional elements. Examples of a useful negative sequence directional element are shown in U.S. Pat. No. 5,349,490, and also in U.S. Pat. No. 5,365,396, both of which are assigned to the same assignee as the present invention. The present invention is a zero sequence directional element. A disadvantage of known zero sequence polarized directional elements is that the zero sequence voltage at the protective relay must have sufficient magnitude that its measured angle is reliable, i.e. when the zero sequence local source impedance is relatively small compared to the zero sequence line impedance, such as might occur for remote faults in strong systems, a conventional zero sequence directional element cannot reliably declare a forward fault condition, which of course is a disadvantage, due to the very low magnitude of zero sequence voltage.

The present invention is an improved zero sequence directional element which overcomes this disadvantage of a conventional zero sequence element, while at the same time providing correct directional declarations where the negative sequence directional elements disclosed in the '490 and '396 patents cannot be used.

DISCLOSURE OF THE INVENTION

Accordingly, the present invention is a directional element for use in a relay for protection of power systems, comprising: means for obtaining zero sequence voltage and current values for a power signal on a power system having known values of zero sequence local source impedance, zero sequence line impedance and zero sequence remote source impedance;

means for calculating a value representative of zero sequence impedance for the power system;

means for establishing a first threshold quantity which is more positive than the zero sequence local source impedance and a second threshold which is less positive than the zero sequence line impedance plus the zero sequence remote source impedance, wherein the first threshold quantity is less positive than the second threshold quantity; and means for comparing said calculated value against the first and second threshold quantities to identify the direction of a fault relative to the relay, the first threshold quantity being for a forward fault and the second threshold quantity being for a reverse fault.

BEST MODE FOR CARRYING OUT THE INVENTION

Figure 1:
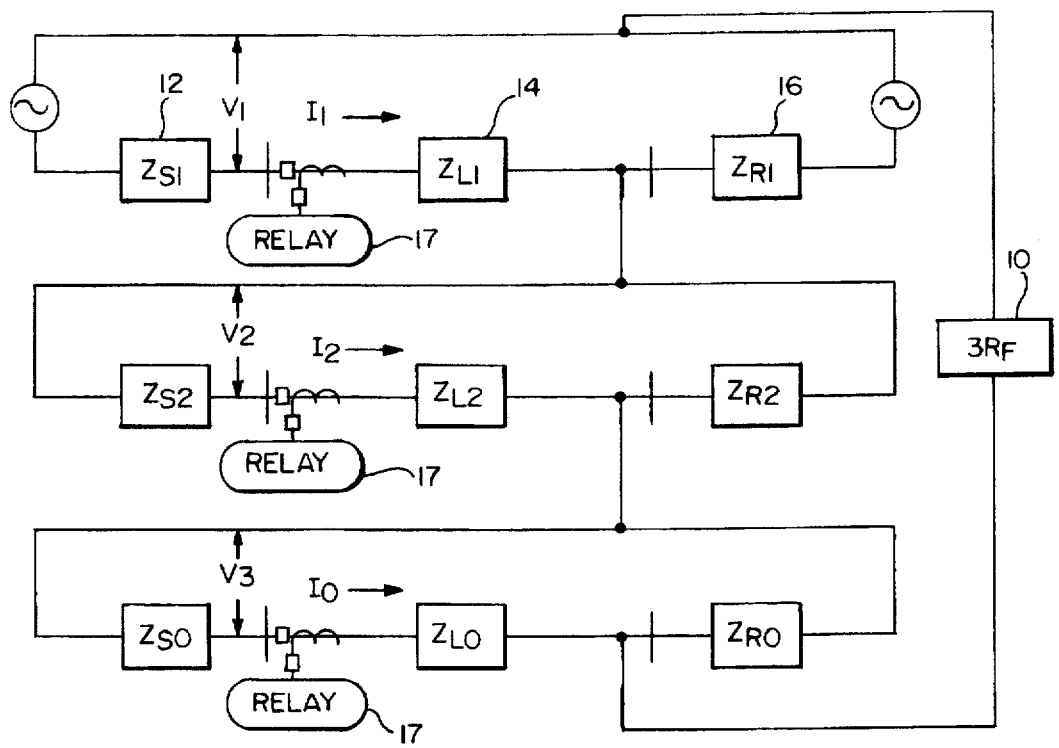
FIG. 1 is the positive, negative and zero sequence impedance network for phase-to-ground faults.

FIG. 1 shows the sequence networks for a phase-to-ground fault, i.e. from one phase line (A, B or C phase) to ground, for a power transmission line. A protective relay will typically monitor all of the sequence network currents and voltages. In FIG. 1, a remote fault resistance 10 is shown as $3R_F$. The positive sequence network includes a positive sequence local source impedance ($Z_{S1}$), a positive sequence line impedance ($Z_{L1}$), and a positive sequence remote source impedance ($Z_{R1}$), shown at 12, 14 and 16, respectively. A protective relay 17 is located relative to the network impedances as shown. The negative sequence quantities and the zero sequence quantities for a remote ground fault are also shown in FIG. 1, with the relay monitoring those quantities as well.

In the directional element of the present invention, only the zero sequence quantities are used. Conventional zero sequence directional elements calculate the "torque" on the element which is produced by a fault in accordance with the following formula:

$$T=Re(S1 \cdot S2^*) \qquad (1)$$

where * indicates a complex conjugate. The torque determination is accomplished by a cosine phase angle comparator. The S1 input=$3V_0$ and the S2 input=$I_R Z_{LO}$, where $3V_0=V_A+V_B+V_C$ and $I_R=I_A+I_B+I_C$. $Z_{SO}$ is the local source impedance. The $V_A$, $V_B$, $V_C$ voltages are the voltages for each phase (A, B and C) of the power system signal at the relay location, while the $I_A$, $I_B$, $I_C$ currents are the currents for the three phases at the relay location.

Since zero sequence current leads the zero sequence voltage if the fault is in front of the relay, and lags the zero sequence voltage if the fault is behind the relay, then when the calculated torque is negative, the directional element declares a forward fault condition (if a minimum torque threshold is exceeded) and conversely declares a reverse fault if the torque is positive (if a minimum torque is exceeded).

As indicated above, however, such a conventional zero sequence voltage-polarized directional element is not reliable in a situation where the zero sequence local source impedance $Z_{SO}$ is small compared to the zero sequence line impedance $Z_{LO}$, which may be the case, for instance, for remote faults on long transmission lines and strong systems. In such a situation, the conventional zero sequence directional element will not be able to reliably declare a fault condition, because the value of $3V_O$ is so small that its measured angle is not reliable.

The present invention, while using zero sequence voltages, is capable of providing a reliable indication of direction even when the zero sequence source impedance is in fact very small compared to the zero sequence line impedance. This is accomplished by adjusting the forward and reverse threshold values, so that the calculated zero sequence impedance when there is a forward fault is below the forward threshold and when there is a reverse fault is above the reverse threshold.

The adjustment to the thresholds is determined as follows: For a forward fault condition, the S1 value can be increased by a value $kI_R Z_{LO}$, where k has a preselected value. The k value should be less than $(Z_{LO}+Z_{RO})/Z_{LO}$, in order to have a reliable S1 for reverse faults, where $Z_{LO}$ is the zero sequence line impedance and $Z_{RO}$ is the zero sequence remote source impedance.

Setting the torque value T (from Equation 1 above) equal to zero with the new S1 value determines the boundary conditions of the compensated directional element as follows:

$$Re[(3V_O - kZ_{LO}I_R)\cdot(Z_{LO}I_R)^*]=0. \qquad (2)$$

where * is the complex conjugate.

Now, substituting $\zeta_O\angle\theta_{LO}$ for $Z_{LO}$ and setting k=1, where $\theta_{LO}$ is the zero sequence line impedance angle, $\zeta_O$ may be solved for as follows:

$$Re[(3V_O - \zeta_O\angle\theta_{LO}I_R)\cdot(\zeta_O\angle\theta_{LO}I_R)^*]=0 \qquad (3)$$

$$Re[3V_O\cdot(\zeta_O\angle\theta_{LO}I_R)^*] - Re[(\zeta_O\angle\theta_{LO}I_R)(\zeta_O\angle\theta_{LO}I_R)^*]=0$$

$$Re[(\zeta_O\angle\theta_{LO}I_R)(\zeta_O\angle\theta_{LO}I_R)^*] = Re[3V_O\cdot(\zeta_O\angle\theta_{LO}I_R)^*]$$

Since $\zeta_O\angle\theta_{LO}\cdot(\zeta_O\angle\theta_{LO})^* = \zeta_O^2$ and $I_R\cdot I_R^* = |I_R|^2$, $$\zeta_O^2|I_R|^2 = \zeta_O\cdot Re[3V_O(\angle\theta_{LO}I_R)^*]$$

$$\zeta_O = \frac{Re[3V_O(1\angle\theta_{LO}I_R)^*]}{|I_R|^2}$$

Figure 2:
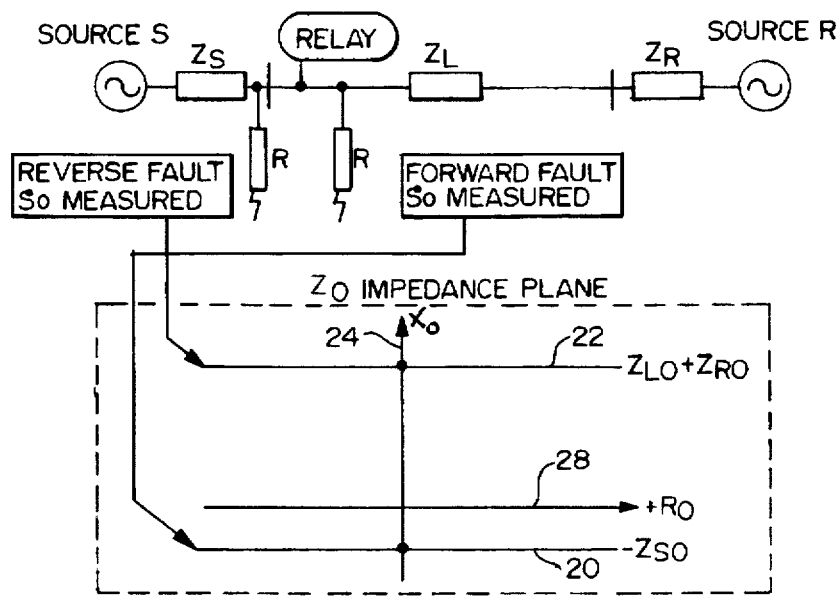
FIG. 2 is the zero-sequence impedance plane diagram showing the impedances, $Z_{SO}$ and $Z_{RO}+Z_{LO}$ for forward and reverse faults, respectively.

For forward faults, $\zeta_O=-|Z_{SO}|$, referred to hereinafter as $\zeta_{OF}$, while for reverse faults, $\zeta_O=|Z_{LO}+Z_{RO}|$, referred to hereinafter as $\zeta_{OR}$. This is shown in a zero sequence impedance plane diagram in FIG. 2, where the forward fault value is shown as $-Z_{SO}$ (line 20), while the reverse fault value $Z_{LO}+Z_{RO}$ is shown at line 22. The $Z_{SO}$, $Z_{LO}$ and $Z_{RO}$ values are known. The zero sequence impedance plane of FIG. 2 has a reactance axis $X_O$, referred to at 24, and a resistance axis $R_O$, referred to at 28.

The calculated value $\zeta_O$ (equation 3 above) in the present invention is compared against adjusted forward threshold $Z_{OF}$ and adjusted reverse threshold $Z_{OR}$. $Z_{OF}$ and $Z_{OR}$ are discussed in the next paragraph. If $\zeta_O$ is less than $Z_{OF}$, the element declares a forward fault condition, while if $\zeta_O$ is greater than $Z_{OR}$, the element declares a reverse fault direction. Hence, in the present invention, the $Z_{OF}$ value defines the forward zone boundary of the relay, while $Z_{OR}$ value defines the reverse zone boundary. In order to provide good forward and reverse coverage, but so that the two regions do not overlap, the values of $Z_{OR}$ and $Z_{OF}$ are separated in the embodiment shown by a value of 0.1 ohm.

The adjusted forward threshold $Z_{OF}$ is set to be larger than $\zeta_{OF}$ and less than the reverse threshold $Z_{OR}$ minus 0.1. The adjusted reverse threshold $Z_{OR}$ is set to be less than $\zeta_{Or}$ and larger than the forward threshold $Z_{OF}$ plus 0.1. The forward and reverse fault regions are seen most clearly in the impedance plane representation of FIG. 3, where region 30 is the reverse fault region, region 32 is the forward fault region, and intermediate region 34 is the region where the relay will not operate.

Figure 3:
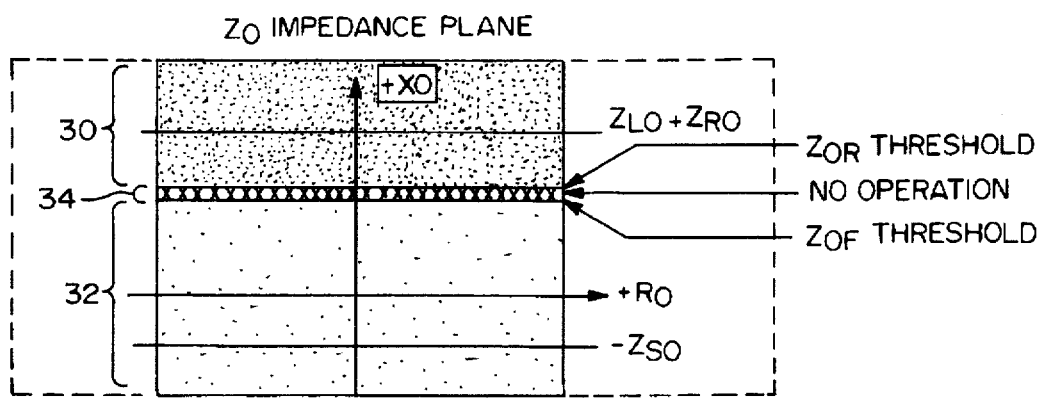
FIG. 3 is a diagram showing the forward and reverse fault regions in the zero sequence impedance plane relative to the forward and reverse fault thresholds.

As can be seen from FIG. 3 and the above description, the thresholds are within an impedance region boundaried by $-Z_{SO}$ and $Z_{LO}+Z_{RO}$, so that even if the source impedance is zero or close to it, there is still sufficient room or margin to select the two thresholds.

Figure 4:
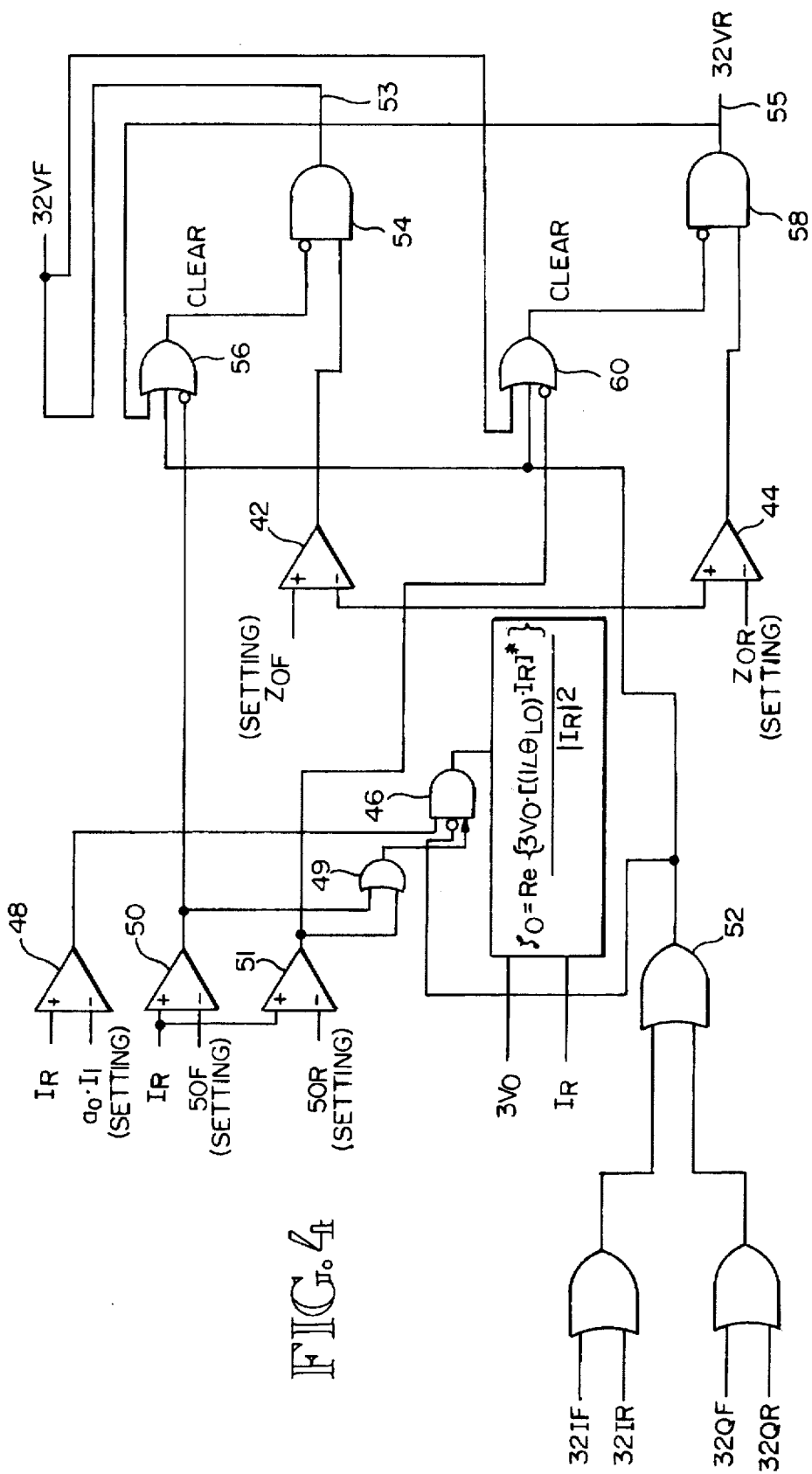
FIG. 4 is a circuit diagram showing the operation of the zero sequence voltage polarized directional element of the present invention.

FIG. 4 shows the implementation of the above-described zero sequence directional element. FIG. 4 includes several protective functions in addition to the basic calculation and comparison functions noted above. The calculation of $\zeta_O$ is accomplished by element 40 in accordance with the formula (3) indicated above. This calculation block has inputs of $3V_O$ and $I_R$. The output of element 40 ($\zeta_O$) is compared against the forward threshold $Z_{OF}$ setting by comparator 42 and against the reverse threshold $Z_{OR}$ by comparator 44.

The calculation element 40 is enabled by the output of AND gate 46. The output of AND gate 46 is high when several conditions coexist. The first is when the magnitude of residual current $I_R$ is larger than the magnitude of the positive sequence current $I_1$ multiplied by a selected supervision factor $a_O$. This determination is made by comparator 48. This comparison is made so as to provide security for the directional element for three-phase fault conditions on unbalanced transmission lines. One example of $a_O$ in a horizontal tower configuration is $a_O$=0.0828.

In addition, residual current $I_R$ must be greater than a 50F element setting, the 50F element being a particular fault detection element. In the embodiment shown, the 50F threshold is within a setting range of 0.25–5 amps for a 5 amp nominal relay. The comparison function is accomplished by comparator 50. Likewise, the residual current $I_R$ must be above the 50R threshold to enable the directional element for reverse faults. The 50R setting range is also 0.25–5 amps for a 5 amp nominal relay. The comparison function for the 50R setting is carried out by comparator 51. The outputs from comparators 50 and 51 are applied to an OR gate 49, the output of which is applied to AND gate 46.

A third input (NOT) to AND gate 46 is from the output of OR gate 52. This particular input involves another aspect of the invention to be discussed in more detail below, and is not present if the zero sequence voltage-polarized element of FIG. 4 is used as the only directional element in a protective relay. When the output of OR gate 52 is high, the output of AND gate 46 is low and the calculation element 40 is not enabled.

The output of forward threshold comparator 42 is applied at one input to an AND gate 54. The output of AND gate 54 provides a forward fault indication referred to as 32VF. The other input to AND gate 54 is a NOT input from OR gate 56. This input is enabling (such that a high output from comparator 42 will produce a 32VF forward fault indication) when the 50F setting has been reached or when the output from OR gate 52 is low, or when there is no indication of a reverse fault. OR gate 56 thus provides a "clearing" or "terminate" function for a forward fault indication when a reverse fault is subsequently indicated.

Likewise, the output of comparator 44 for reverse faults is applied as one input to an AND gate 58. The other input (NOT) to AND gate 58 is from OR gate 60. The output from OR gate 60 is low (so that the output from AND gate 58 is high when the output from comparator 44 is high, indicating a reverse fault) when the 50R reverse threshold setting has been exceeded, or when the output of OR gate 52 is low, and when there is no subsequent indication of a forward fault from AND gate 54. When the output of OR gate 60 is low (so that the NOT input is high) and the comparator 44 output is high, the output of AND gate 58 goes high and there is provided a signal indication of a reverse fault (32VR) on line 55. Should a subsequent forward fault indication be produced, the output of OR gate 60 will go high, blocking AND gate 58 and "clearing" the reverse fault indication 32VR.

Hence, the zero sequence voltage-polarized directional element of FIG. 4, using the two separate modified thresholds for forward and reverse faults, provides a reliable indication of fault conditions even for remote faults with strong local sources (small zero sequence source impedance).

In a related aspect of the specific zero sequence voltage polarized directional element disclosed above, it is possible to combine such a directional element with other directional elements, e.g. a zero sequence current-polarized directional element and a negative sequence voltage-polarized directional element, to provide an adaptive or universal directional element system for unbalanced faults.

Figure 5:
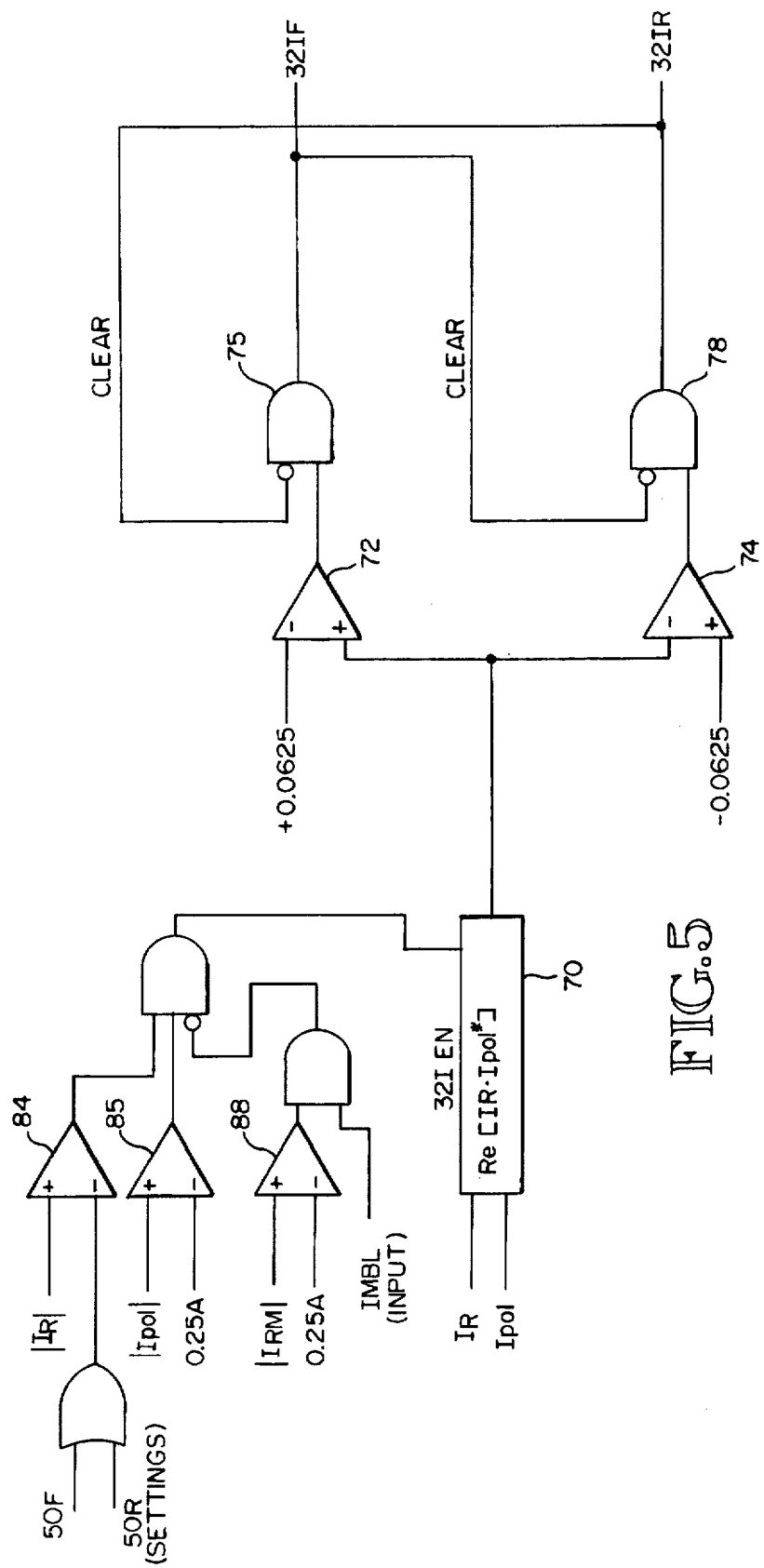
FIG. 5 is a circuit diagram showing the operation of a zero sequence current-polarized directional element.

FIG. 5 shows a zero sequence current-polarized directional element which could be used in such an arrangement. A calculation is made by element 70, multiplying the residual current $I_R$ and an external polarizing source current ($I_{POL}$) and obtaining the real portion of the value thereof. This resulting calculated value is applied to two comparators 72 and 74. Comparator 72 compares the calculated value with a +0.0625 value for a 5 amp nominal relay. If the calculated value is greater than the threshold, the high output of comparator 72 is applied to an AND gate 75, which produces a 32IF forward fault indication on line 75. The forward fault indication can be cleared, however, by a subsequent reverse fault indication from AND gate 78.

Conversely, in comparator 74, the calculated value from calculator 70 is compared against a −0.625 reverse fault threshold value. If this threshold value is less (more negative) than the calculated value, a high output from comparator 74 is applied to AND gate 78. The AND gate 78 is cleared by a forward fault indication from AND gate 75.

The calculation elements have several threshold operating requirements. First, the absolute value of $I_R$ must exceed pre-established settings. This is established by comparator 84. Further, the absolute value of the polarizing current $I_{POL}$ must exceed 0.25 amps, as established by comparator 85. Further, there must be substantially no residual current in the parallel phase line, as established by comparator 88 and at the same time, there should be a lack of assertion of the IMBL input which is for the detection of zero sequence source isolation, which may cause misoperation of the current-polarized directional element.

Figure 6:
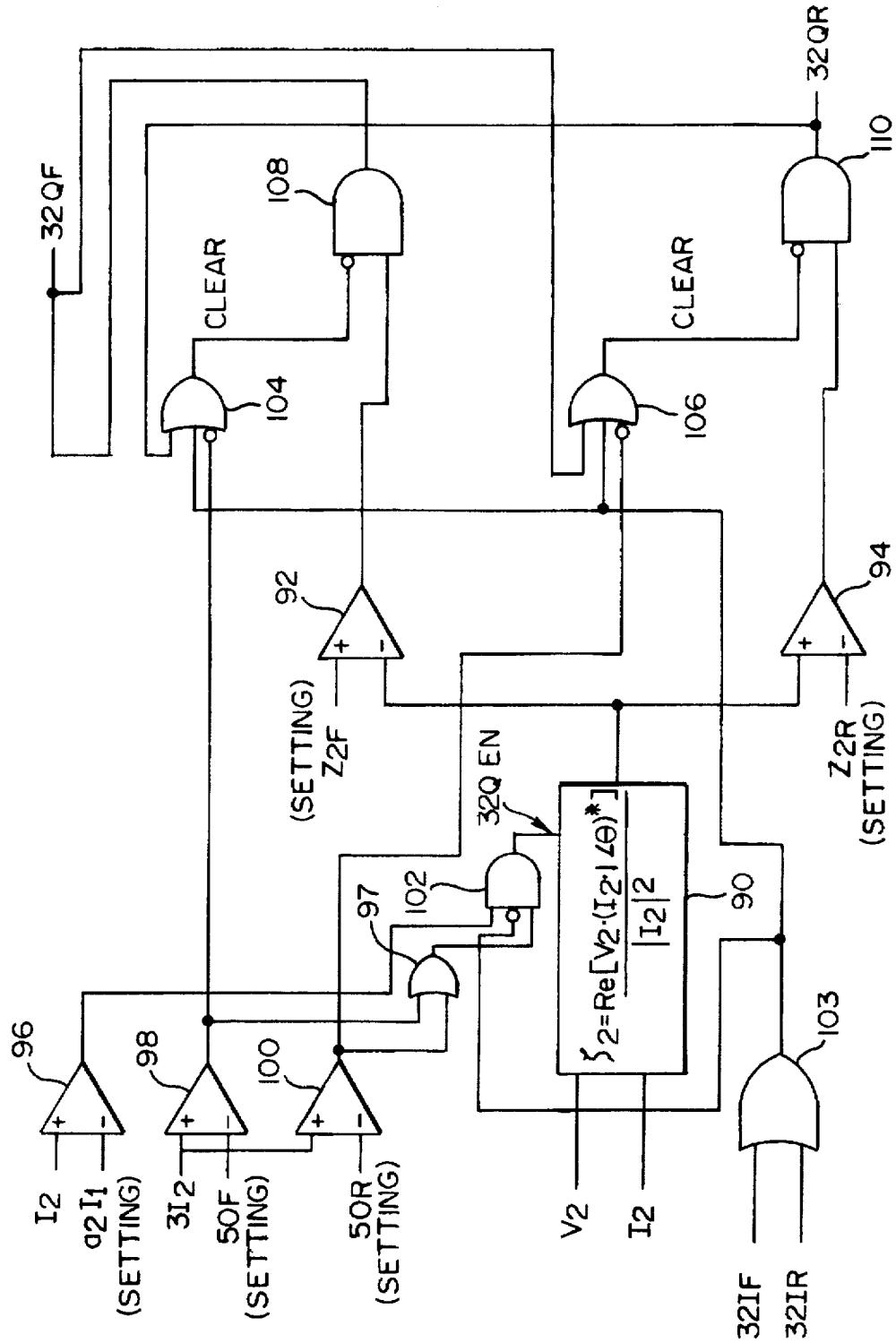
FIG. 6 is a circuit diagram showing a negative sequence voltage polarized directional element.

The negative sequence directional element shown in FIG. 6 which is appropriate for use in the adaptive or universal directional element is explained in detail in the '490 and '396 patents discussed above, which are incorporated herein by reference. Briefly, the negative sequence voltage $V_2$ and current $I_2$ are applied as inputs to an impedance calculation element 90, which produces an output which in turn is compared in comparators 92 and 94 against forward and reverse thresholds respectively. The impedance calculation formula is shown in FIG. 6 as $$\zeta_2 = \frac{Re[V_2(I_2 \cdot 1\angle\theta)^*]}{|I_R|^2}.$$

Comparators 96, 98 and 100 provide specific qualifying protection to enable the calculation element 90. The negative sequence current must exceed a certain minimal threshold $a_2(I_1)$, where $a_2$ is a selected constant, and $I_1$ is the positive sequence current. The negative sequence current also must have minimum values for forward and reverse fault determinations, respectively. An OR gate 97 and AND gate 102 complete the enabling protection feature. AND gate 102 is also responsive to the lack of a signal from OR gate 103. The negative sequence directional element of FIG. 6 also features an output "clearing" capability through OR gates 104, 106 and AND gates 108, 110, for the respective forward and reverse direction outputs, similar to that for the circuit elements of FIGS. 4 and 5.

In the universal directional element embodiment, the zero sequence current-polarized directional element (FIG. 5) is first in line; if this individual element makes a directional decision, then the other two elements do not run. This arrangement is implemented, for instance, by the 32IF and 32IR inputs being applied to OR gate 52 in FIG. 4 and OR gate 103 in FIG. 6, which effectively disables the impedance calculation element in those circuits.

If the zero sequence current-polarized directional element (FIG. 5) does not make a directional decision, then the negative sequence voltage-polarized directional element (FIG. 6) is next in line in the sequence of the embodiment described. If the negative sequence directional element makes a directional decision, then the zero sequence voltage-polarized directional element (FIG. 4) is disabled, by inputs 32QF and 32QR in FIG. 4 operating through OR gate 52.

If the negative sequence directional element of FIG. 6 does not make a directional decision, then the zero sequence voltage-polarized directional element of FIG. 4 has the opportunity to make the directional decision. Hence, the sequence of operation of the individual directional elements comprising the universal directional element of the present invention is (1) the zero sequence current-polarized directional element, (2) the negative sequence directional element and (3) the zero sequence voltage-polarized directional element.

This sequential arrangement has advantages in many situations, such as when the voltage and current values necessary for operation of a particular directional element may not be available in a selected application. For instance, in a situation where the positive sequence source is removed from the power system, the negative sequence source is removed as well. If the directional element in the relay is a negative sequence element, then the relay cannot make a directional decision because the negative sequence quantities are not available.

Commercially available relays select only zero sequence or negative sequence quantities for direction determinations; after the initial element selection is made, the same directional element must be used for all power conditions. This involves compromises, depending upon the particular application.

In the present invention, however, a directional decision is virtually guaranteed for all power system conditions, since sequence quantities and application conditions necessary to run at least one of the individual directional elements in the sequence will nearly always be available. Hence, the invention is appropriately referred to as an adaptive or universal directional element for unbalanced faults, utilizing three individual directional elements in a particular order. It should be understood, however, that a different order than that specified above may be utilized, or in some cases two elements or more than three elements could be used.

Hence, a new zero sequence directional element has been disclosed which provides additional directional assurance relative to conventional zero sequence elements and which has certain advantages over comparable negative sequence directional elements as well. In addition, different individual directional elements are combined in a particular order to provide an adaptive or universal directional element capability.

Although a preferred embodiment of the invention has been disclosed herein for illustration, it should be understood that various changes, modifications and substitutions may be incorporated in such embodiment without departing from the spirit of the invention, which is defined by the claims which follow.

What is claimed is:

1. A directional element for use in a relay for protection of power systems, comprising:

means for obtaining zero sequence voltage and current values for a power signal on a power system having known values of zero sequence local source impedance, zero sequence line impedance and zero sequence remote source impedance;

means for calculating a value representative of a zero sequence impedance for the power system, in accordance with the following formula:

$$\frac{Re[3V_0(1\angle\theta_{LO}I_R)^*]}{|I_R|^2}$$

wherein
$I_R = I_A + I_B + I_C$
$V_O = V_A + V_B + B_C$
and
$\theta_{LO}$=zero sequence line impedance angle means for establishing first and second threshold quantities which are within an impedance plane region bounded by (1) the zero sequence line impedance plus the zero sequence remote source impedance and (2) the negative zero sequence local source impedance, and wherein the first threshold quantity is more positive than the negative zero sequence local source impedance and less positive than the second threshold minus 0.1 ohms and wherein the second threshold is less positive than the zero sequence line impedance plus the zero sequence remote source impedance and more positive than the first threshold quantity plus 0.1 ohms; and means for comparing said calculated value against the first and second threshold quantities to identify the direction of a fault relative to the relay, the first threshold quantity being for a forward fault and the second threshold quantity being for a reverse fault.

2. An apparatus of claim 1, including means for providing output indications of a forward fault and a reverse fault.

3. An apparatus of claim 2, including means for clearing a forward fault indication upon the occurrence of a reverse fault determination and vice versa.

4. An apparatus of claim 1, wherein the first and second threshold quantities are separated by at least 0.1 ohm.

5. An apparatus of claim 1, wherein $I_A + I_B + I_C$ equals residual current and wherein the apparatus includes means for not enabling the calculating means if the residual current is small compared to the magnitude of positive sequence current multiplied by a preselected value.

6. An apparatus of claim 1, wherein $I_A + I_B + I_C$ equals residual current, the apparatus further including means for enabling the calculating means to declare a forward fault only if the residual current exceeds a first residual current threshold and enabling the calculating means to declare a reverse fault only if the residual current exceeds a second residual current threshold.

7. An adaptive, universal directional element, comprising:

at least two separate, individual directional elements arranged in a selected sequence of operation, with a first element in said selected sequence providing directional indications of forward and reverse faults within selected operating parameters; and means for blocking the operation of the other directional elements if the first element provides a directional indication and for enabling a second of said at least two separate, individual directional elements when the first element is unable to provide a directional indication.

8. The universal directional element of claim 7, including three individual directional elements, arranged in a selected sequence, one directional element being a zero sequence current-polarized element, another element being a negative sequence voltage-polarized directional element, and the other directional element being a zero sequence voltage-polarized directional element.

9. An apparatus of claim 8, wherein the order of operation of the three individual directional elements is the zero sequence current-polarized element, the negative sequence voltage-polarized element, and the zero sequence voltage-polarized element.

10. An apparatus of claim 8, wherein each directional element includes means for clearing an indication of a forward fault direction upon the occurrence of a reverse fault indication and vice versa.

11. An apparatus of claim 7, wherein each of the individual directional elements includes means for enabling the element for forward and reverse fault determinations, respectively, when selected current values exceed threshold values.

* * * * *